United States Patent [19]

McCartney et al.

[11] 4,056,305

[45] Nov. 1, 1977

[54] SINGLE OPTICAL FIBER CONNECTOR UTILIZING ELASTOMERIC ALIGNMENT DEVICE

[75] Inventors: Ronald L. McCartney, Orange; Bruce K. Arnold, El Toro; Vaughn C. Hogan, Sun Valley, all of Calif.

[73] Assignee: International Telephone and Telegraph Corporation, New York, N.Y.

[21] Appl. No.: 680,170

[22] Filed: Apr. 26, 1976

[51] Int. Cl.² .................................................. G02B 5/16
[52] U.S. Cl. .................................................. 350/96 C
[58] Field of Search ..................................... 350/96 C

[56] References Cited

U.S. PATENT DOCUMENTS

| 3,734,594 | 5/1973 | Trambarulo | 350/96 C |
| 3,960,531 | 6/1976 | Kohanzadek | 350/96 C X |
| 3,989,567 | 11/1976 | Tardy | 350/96 C X |

OTHER PUBLICATIONS

Hawk, R. M., Thiel, F. L., "Low Loss Splicing and Connection of Optical Waveguide Cable", Proc. Soc. Photo-Optical Inst. Eng., Guided Optical Comm. vol. 63, Aug. 19-23, 1975.
Dworkin, Coryell, Dragoo, "The Application of Optical Waveguides...", Proc. Soc. of Photo-Optical Inst. Eng., Guided Optical Comm. vol. 63, Aug. 19-23.

*Primary Examiner*—John K. Corbin
*Assistant Examiner*—Rolf Hille
*Attorney, Agent, or Firm*—Thomas L. Peterson

[57] ABSTRACT

A connector for coupling a pair of single optical fibers is disclosed. The connector comprises a deformable elastomeric alignment element having a bore therethrough having a central uniform diameter portion and outwardly tapered end portions. Two sets of three equal diameter cylindrical rods are mounted in the opposite ends of the bore. Each set of rods defines an interstitial space therebetween which receives an optical fiber. The sets of rods have mating end faces which abut each other in the bore. The rods of each set have an interference fit in the central portion of the bore causing the rods to be resiliently compressed inwardly to engage each other and the fiber therebetween. By the compression of the rods, the rods of each set are disposed at the vertices of an equilateral triangle so that the fibers in the interstitial spaces between the rods become precisely laterally aligned. The number of rods in each set may exceed three so that a plurality of interstitial spaces are defined by the rods for coupling more than one pair of single optical fibers.

20 Claims, 9 Drawing Figures

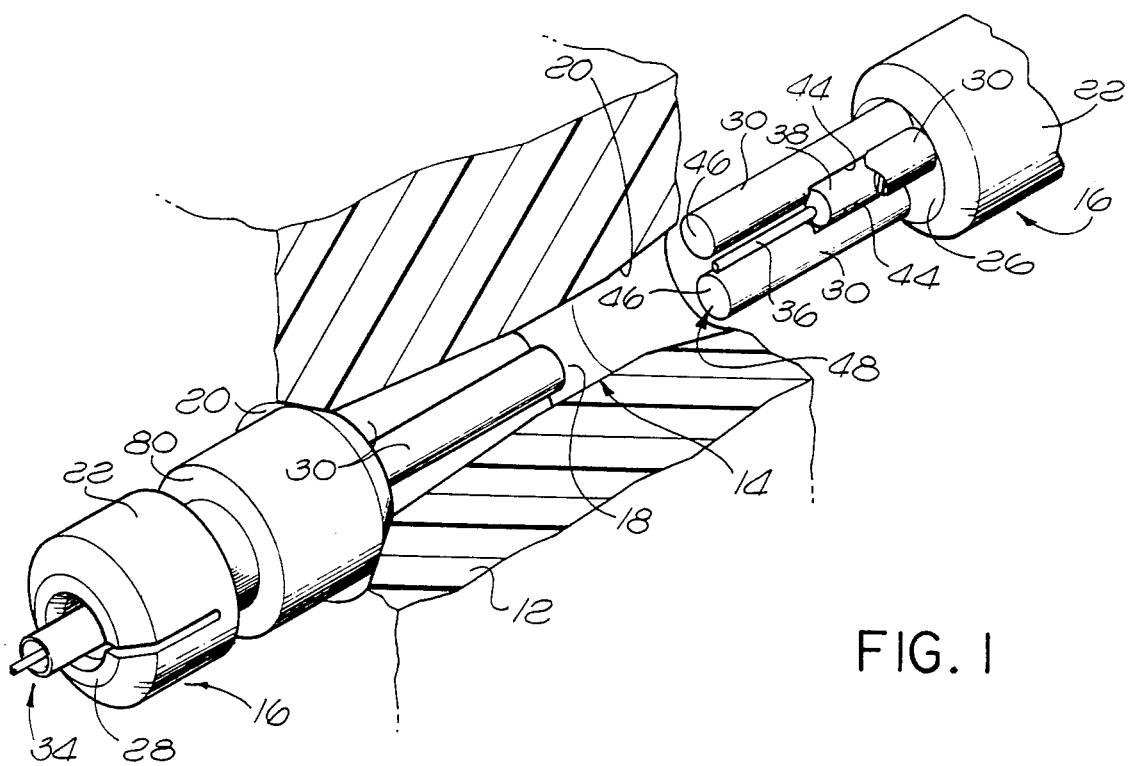
FIG. 1
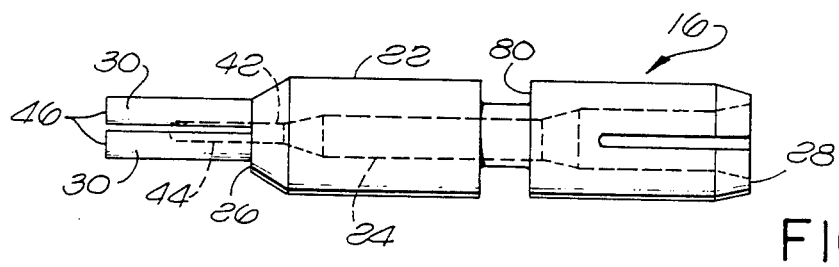
FIG. 2
FIG. 4
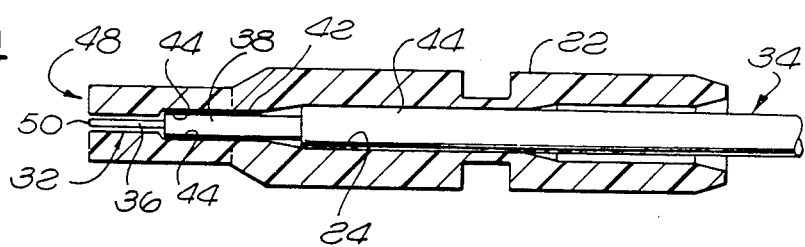
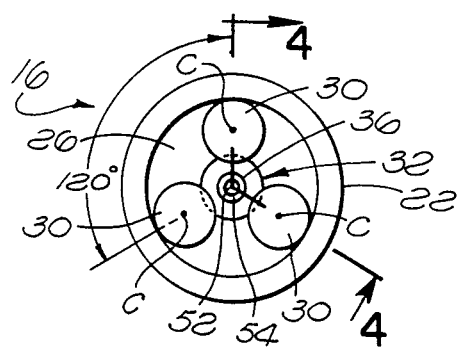
FIG. 3
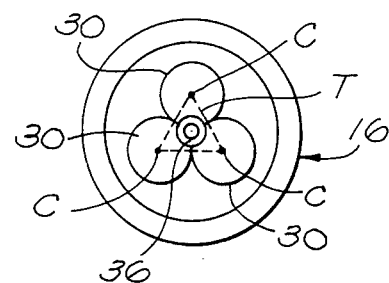
FIG. 5

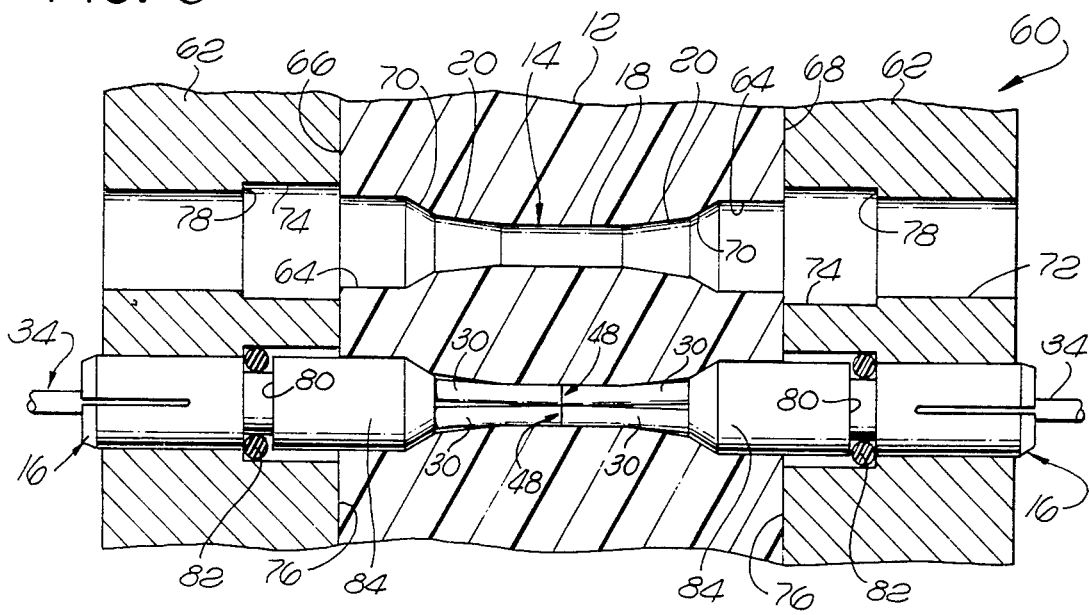
FIG. 6
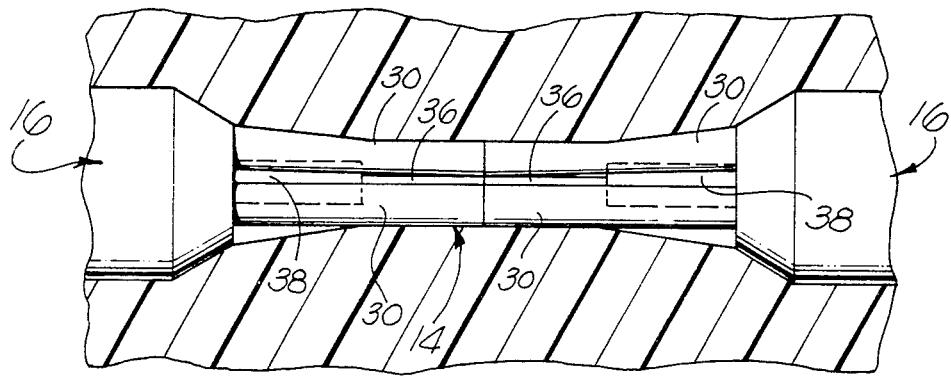
FIG. 7
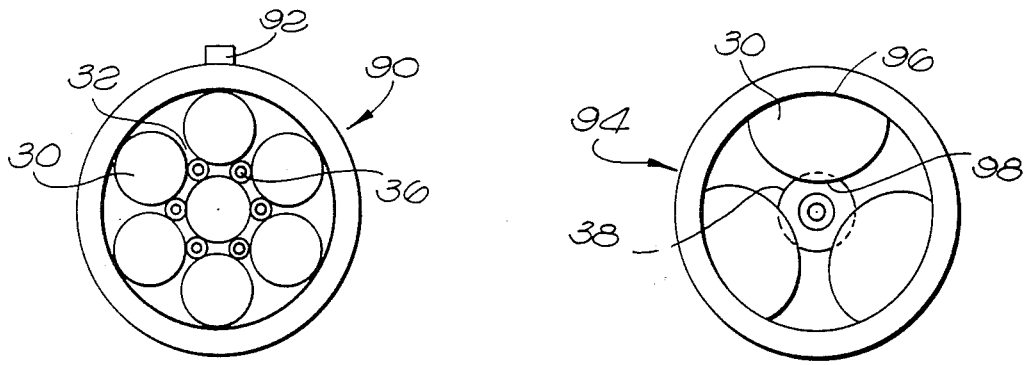
FIG. 8
FIG. 9

SINGLE OPTICAL FIBER CONNECTOR UTILIZING ELASTOMERIC ALIGNMENT DEVICE

BACKGROUND OF THE INVENTION

The present invention relates generally to a connector and, more specifically, to an optical coupler for single optical fibers.

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber calbes with protective outer claddings or jackets. The jackets make them resemble ordinary metalliccore electrical cable upon superficial external inspection. Obviously, if fiber optic cables are to be used in practical signal transmission and processing systems, practical connectors for the connection and disconnection of fiber optic cables must be provided.

Some references will now be given for background in the state of fiber optic art in general. An article entitled, "Fiber Optics," by Narinder S. Kapany, published in *Scientific American,* Vol. 203, pgs, 72–81, November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or axial misalignment, are among the factors effecting the light transfer efficiency at a connector. In this connection, attention is directed to the *Bell System Technical Journal,* Vol. 50, No. 10, December 1971, specifically to an article by D. L. Bisbee, entitled, "Measurement of Loss Due to Offset, and End Separations of Optical Fibers." Another *Bell System Technical Journal* article of interest appeared in Vol. 52, No. 8, October 1973, and was entitled, "Effect of Misalignments on Coupling Efficiency on Single-Mode Optical Fiber But Joints," by J. S. Cook. W. L. Mammel and R. J. Grow.

Fiber optic bundles are normally utilized for only short transmission distances in fiber optic communications networks. On the other hand, fibers are used individually as optical data channels to allow transmission over many kilometers. At present, most fiber optic cables are multi-fiber bundles due to the less stringent splicing requirements, greater inherent redundancy, and higher signal-to-noise ratio. The difficulty in achieving connections between single fibers which are insensitive to axial misalignment problems has created an obstacle to the use of long run single data transmission systems.

Therefore, a connector or coupler is required to eliminate lateral tolerances if low-loss connections are to be obtained in the use of sinle fiber optical transmission arrangements. "V" groove and metal sleeve arrangements have been used to interconnect single fibers. Reference is made to U.S. Pat. No. 3,768,146 which discloses a metal sleeve interconnection for single fibers.

Another known device, as shown in U.S. Pat. No. 3,734,594, utilizes a deformable annular core having pressure plates at the ends. The fiber ends are inserted into the core and an axial force is applied to the plates to deform the core radially, thereby aligning and securing the fibers.

These prior devices, however, do not readily provide sufficient accuracy for joining and aligning small diameter cores of optical fibers.

Copending application of Charles K. Kao entitled, "Precision Optical Fiber Connector," Ser. No. 613,390, filed Sept. 15, 1975, assigned to the assignee of the present application, discloses a single optical fiber connector in which the ends of mating fibers are precisely aligned and coupled together in the interstice between three like contacting cylindrical rods. The rods are mounted along and around the fibers within an adjustable connector assembly. Means is provided for expanding the interstice to insert the fiber ends and for clamping the rods in position around the fibers. Copending application of Charles K. Kao entitled, "Precision Surface Optical Fiber," Ser. No. 629,210, filed Nov. 5, 1975, assigned to the assignee of the present application, discloses an optical fiber in which the plastic cladding thereof is formed with three rounded indentations along its surface and a thin metal ferrule is formed around the cladding at the mating end of the fiber. A pair of such fibers may be aligned in a three rod arrangements of the type mentioned above.

A heremaphroditic connector for coupling a pair of single optical fibers is disclosed in copending application of Ronald L. McCartney entitled, "Single Optical Fiber Connector," Ser. No. 629,004, filed Nov. 5, 1975, also assigned to the assignee of the present application. The connector comprises a pair of connector members each containing at least one single optical fiber terminated by a termination pin. The pin includes a metal eyelet crimped about the optical fiber in three places providing three, spaced, curved indentations which centrally position the fiber in the pin. When the connector members are mated, the mating termination pins are positioned so that indentations therein are generally aligned. Three arcuate cam or spring members are forced into the indentations in the mating termination pins to accurately laterally align the pins and, hence, the optical fibers therein.

In our copending application entitled, "Single Optical Fiber Connector," Ser. No. 680,171, filed concurrently by herewith, there is disclosed a single optical fiber connector comprising a base plate having a V-groove in its upper surface having a transverse cross-section of an equilateral triangle. Two sets of three equal diameter cylindrical rods lay in the groove, each defining an interstitial space therebetween which receives an optical fiber. The sets of rods have mating end faces which abut each other in the groove. A compression plate is mounted over the base plate to arrange the rods in the V-groove so that the centers of the rods are disposed at the vertices of the same equilateral triangle whereby the fibers in the interstitial spaces between the rods become precisely laterally aligned. Such connector arrangement is particularly suited for a flat cable having single optical fibers.

The purpose of the presnt invention is to provide a new separable single fiber connector based upon the three rod coupling approach disclosed in the aforementioned copending applications, and which will provide a controlled, accurate alignment of mating optical fibers in a manner which will minimize light transmission losses, which is easily manufactured and assembled, and practical for commercial field use.

SUMMARY OF THE INVENTION

According to the principal aspect of the present invention, there is provided a fiber optic connector for releasably coupling a pair of single optical fibers. The connector comprises a deformable elastomeric alignment element having a bore therethrough. A pair of like-sets of at least three rods are mounted lengthwise in the bore. The rods of each set have adjacent like-shaped cylindrical surfaces providing at least one tricuspid interstitial space between the rods for receiving an optical fiber. The sets of rods having mating end faces which abut each other when the sets of rods are pushed into the opposite ends of the bore in the alignment element. The relative dimensions of the two sets of rods and the bore in the elastomeric alignment element are selected so that the region of the element surrounding the mating end faces of the rods is strained to exert a radially inwardly directed compressive force urging the rods of each set inwardly. Such inward compression of the rods causes the adjacent cylindrical surfaces thereof to engage each other and the fiber disposed therebetween so that the centers of any three contiguous rods of each set are disposed at the vertices of an equilateral triangle, whereby the fibers in the corresponding interstitial spaces in the two sets of rods become precisely laterally aligned. The coupling arrangement of the present invention is particularly suited for axially mated connectors.

BRIEF DESCRIPTION OF THE DRAWINGS

FIG. 1 is a perspective, fragmentary illustration of the connector of the present invention wherein one fiber optic contact is mounted in the bore of the elastomeric alignment element and the mating contact is shown outside of the alignment element positioned to be inserted into the bore therein;

FIG. 2 is a side elevation of one of the contacts illustrated in FIG. 1;

FIG. 3 is an enlarged front end view of the contact illustrated in FIG. 2;

FIG. 4 is a longitudinal sectional view taken along line 3—3 of FIG. 4 showing the contact terminated to a fiber optic cable;

FIG. 5 is a front end view of the contact showing how the alignment rods thereof are deflected radially inwardly to engage the optical fiber when the contact is mounted in the elastomeric alignment element illustated in FIG. 1;

FIG. 6 is a longitudinal sectional view through a preferred form of the connector of the present invention showing a pair of fiber optic contacts mounted in one of the bores therein;

FIG. 7 is an enlarged sectional view showing the mating end of the contacts in the alignment element illustrated in FIG. 6;

FIG. 8 is a front end view of a multi-channel fiber optic contact in accordance with the invention containing six optical fibers; and FIG. 9 is a front end view of an alternative form of a single channel contact in accordance with the invention.

DESCRIPTION OF THE PREFERRED EMBODIMENTS

Referring now to FIG. 1 of the drawings in detail, there is illustrated the connector of the present invention, generally designated 10, which comprises a deformable elastomeric alignment element 12 having a bore 14 therethrough and pair of fiber optic contacts 16 which are adapted to be mounted in the bore 14. The alignment element 12 may be formed of any elastomeric material, however silicone rubber is a preferred material. The bore 14 in the element 12 has a uniform diameter central region 18 and outwardly tapering end portions 20.

As seen in FIGS. 1 to 4, each contact 16 comprises a generally cylindrical body 22 having a bore 24 extending longitudinally therethrough from the front 26 to the rear 28 of the body. Three resilient cylindrical posts or rods 30 extend forwardly from the front 26 of the body 22 in parallel, laterally spaced relationship. The rods have the same diameter. The laterally spaced rods define a tricuspid interstitial space 32 therebetween.

The bore 24 is dimensioned to slidably receive an optical fiber cable 34. The cable comprises an optical fiber 36 having an inner jacket 38 and an outer jacket 40. The forward portion of the outer jacket 40 is removed from the cable to expose the inner jacket 38, and the forward section of the inner jacket is removed to expose the optical fiber 36. The bore 24 in the contact body 22 has a reduced diameter forward section 42 which opens at the front 26 of the body. The reduced diameter section 42 is dimensioned to slidably receive the inner jacket 38 of the cable 34.

Arcuate recesses 44 are formed in the adjacent cylindrical surfaces of the rods 30 adjacent to the front 26 of the body 22, thereby defining a cylindrical passage which is coaxial with the bore 24. The recesses 44 terminate behind the front ends 46 of the rods 30. Such cylindrical passage has the diameter as the forward section 42 of the bore 24 so that the inner jacket 38 of the cable 34 may extend forwardly toward the front ends of the rods 30. The front ends of the rods lie in a common plane vertical to the longitudinal axis of the contact body and define the mating end face 48 of the contact. The mating end 50 of the fiber 36 terminates flush with the mating end face 48 of the contact.

The provision of the arcuate recesses 44 in the adjacent cylindrical surfaces of the rods 30 is an important feature in that it allows the inner jacket 38 to extend a sufficient distance toward the mating end of the fiber 50 so that the jacket will support the fiber within the interstitial space 32 defined by the three rods, thus preventing the fiber from protruding outwardly from the spaces between the rods which might otherwise occur if the inner jacket 38 terminated behind the front 26 of the contact body.

As best seen in FIG. 3, the rods 30 of each contact 16 are arranged so that their centers C are offset 120° from each other. The centers C are equidistant from the center axis of the contact body 22. The rods are sufficiently resilient so that when a radially inwardly directed compressive force is applied to the rods, the rods will shift into engagement with each other, as seen in FIG. 5, whereupon the centers C of the rods will lie at the vertices of an equilateral triangle T. In FIGS. 3 and 5, the optical fiber 36 is shown as having a central light conducting core 52 and an outer cladding 54. It will be appreciated, however, that other forms of optical fibers may be utilized, for example a CVD (chemical vapor deposition) fiber or a graded index fiber. When the rods 30 are deflected radially inwardly, the cylindrical surfaces thereof will engage the fiber 36 at three points of line contact, centrally locating the fiber within the equilateral triangle T.

The diameter of the central region 18 of the bore 14 in the elastomeric alignment element 12 is less than the maximum cross-sectional dimension of the forward end of each contact 16 so that there is an interference fit between the rods 30 and the central region of the bore. The outer regions of the tapering end portions 20 of the bore have diameters greater than the cross-section of the forward portions of the contacts to facilitate insertion of the contacts in the bore. When the contacts are pushed into the opposite ends of the bore so that the mating end faces 48 thereof abut each other in the central region 18 of the bore, the interference fit between the rods of the contacts and the wall of the bore causes the wall to resiliently expand outwardly resulting in a radially inwardly directed compressive force urging the rods of each contact into the triangular pattern illustrated in FIG. 5. Since the rods of each contact have the same diameter, the centers of the rods will become located at the vertices of a like-dimensioned equilateral triangle T with the result that the optical fibers 36 mounted in the contacts will become precisely laterally aligned. We have unexpectedly found that such alignment is achieved even though the mating contacts 16 are not keyed to align the corresponding cylindrical rods of the contacts in the bore 14.

It is possible for the rods 30 of the contacts to be formed of a relatively rigid material, but it is necessary that very close tolerances be maintained on the diameters of the rods to assure that they will not overstress the optical fibers 36 when compressed. For example, if the fibers are formed of quartz or glass, they may be fractured if the diameter of the rods is too small. Therefore, in order to construct a connector which is effective for connecting single optical fibers without precisely maintaining the dimensions of the rods 30, it is preferred that the rods be formed of a slightly deformable material. Thus, as seen in FIG. 5, when the deformable rods 30 are radially inwardly compressed by inserting the contact in the elastomeric alignment element 12, the regions of the rods which engage the fibers 36 will deform slightly. The extent of such deformation as somewhat exaggerated in FIG. 5 for purposes of illustration. In spite of the slight deformation of the rods, the centers C of the rods still become located at the vertices of the equilateral triangle T so that precise alignment between the optical fibers 36 in the mating contacts 16 is achieved. A suitable material for the contact body 22 is nylon sold under the trademark Zytel by DuPont. Other slightly deformable materials preferably exhibiting properties of resilience may be utilized.

Reference is now made to FIGS. 6 and 7 of the drawings which illustrate the preferred structure of a connector 60 in accordance with the present invention, wherein parts similar to those employed in the embodiment illustrated in FIGS. 1 to 5 bear the same reference numerals. In the connector 60, pressure plates 62 are disposed on opposite sides of the elastomeric alignment element 12. The element contains a plurality of bores 14 therethrough, two being shown by way of example. Each bore has a uniform diameter central region 18 and outwardly tapering portions 20 at opposite ends of the central portion. The dimensional relationships of the central and tapering portions of the bore 14 are as previously described with respect to the embodiment illustrated in FIGS. 1 to 5. Counterbores 64 are formed in the opposite end faces 66 and 68 of the alignment element 12 coaxial with the central region 18 of the bore. Tapered transitional regions 70 join the counterbores 64 to the tapered portions 20 of the bore. The diameter of each counterbore 64 is slightly greater than the diameter of the cylindrical body 22 of the contactss 16 so as to slidably receive the body of the contact. Preferably, the axial length of the counterbores 64 is sufficiently great that the contacts 16 will be self supported by the alignment element 12. This arrangement assures accurate axial alignment of the contacts when they are inserted into the oposite ends of the bore 14.

The pressure plates 62 have bores 72 therein aligned with the bores 14 and dimensioned to receive the rear portions of the contact bodies 22. A counterbore 74 is formed in the front face 76 of each pressure plate 62 coaxial with each bore 72 defining an annular forwardly facing shoulder 78. An annular groove 80 is formed in each contact 16. The shoulders 78 in the pressure plates 76 and the grooves 80 in the contacts 16 are so located that when the contacts are fully mounted in the alignment element 12, the grooves 80 are in front of and adjacent to the shoulders 78. Elastomeric O-rings 82 are positioned in the grooves 80 in the contacts. The diameter of each O-ring is sufficiently great that the outer region of the O-ring extends outwardly beyond the outer cylindrical surface of the body 22 of the contact in front of the annular shoulder 78. When the mating end faces 48 of the contacts engage in the central region of the bore 14 in the alignment element 12 by coupling means associated with the respective pressure plates 62, not shown, the pressure plates move axially toward each other to compress the alignment element 12 and also the O-rings 82. The compression of the O-rings 82 assures that a slight axial compressive force will be applied to the contacts to assure continuous abutting of the mating end faces thereof. The O-ring arrangement 82 also provides relief in axial manufacturing tolerances, thereby assuring that the mating end faces of the contacts will engage each other in the alignment element 12. Thus, the axial tolerance relief arrangement of the present invention functions in a similar fashion to the axial tolerance relief assembly disclosed in U.S. Pat. No. 3,947,182 to R. L. McCartney.

Axial compression of the elastomeric alignment element 12 also causes the walls of the counterbores 64 to deform radially inwardly to firmly engage the forward portions 84 of the contact bodies. Such deformation of the walls of the counterbores 64 provides a seal between the alignment element and the contacts, dampens vibrations of the contacts during use of the connector, and further assures an effective supporting of the bodies of the contacts in axial alignment in the bore 14. Such axial compression of the elastomeric alignment element 12, however, is not essential for the operation of the invention since the interference fit between the rods 30 of the contacts and the central region 18 of the bore 14 results in a self-alignment of the contacts and, thus, the fibers therein when the contacts are pushed into the opposite ends of the bores 14.

FIG. 7 shows on an enlarged scale how the elastomeric alignment element 12 functions to deflect the alignment rods 30 of the contacts 16 radially inwardly into engagement with each other to achieve alignment of the optical fibers 36 in the contacts. A connector, as illustrated in FIGS. 6 and 7, has been tested and found to consistently achieve light transmission losses below 2.0 dB, and frequently less than 1.0 dB, using 2 mil core graded index fibers and CVD fibers.

While it is preferred that the plastic jackets of the optical fiber cable 34 be removed to expose the forward end of the fiber 36, the plastic jacket 38 could be permitted to extend to the mating end 50 of the fiber. With such an arrangement, the plastic jacket 38 would be deformed when the alignment rods 30 are compressed inwardly toward the fiber 36. Since the fiber 36 is not always perfectly concentric with respect to the jacket 38, it is preferred that the jacket be removed so that the fiber is bare where it is engaged by the alignment rods 30 of the contact 16. Since the bare fiber is extremely fragile, it may also be desirable to provide a thin protective coating thereon, such as silicone rubber or a polyimide sold under the trademark Kynar by DuPont.

While the embodiments disclosed in FIG. 1 to 7 are single channel connectors, the invention may also be applicable to a multi-channel connector. For example, FIG. 8 illustrates a multi-channel contact for coupling two sets of six optical fibers. Such contact, generally designated 90, is identical to the contacts 16 except that it has seven alignment rods 30, one centrally located on the contact body 22, and the other six arranged in a circular array around the center rod. The rods are laterally spaced apart from each other to define six interstitial spaces 32 for receiving the optical fibers 36. The fibers 36 in the contact 90 are engaged with six fibers in a mating like-contact by inserting the contacts into an elastomeric alignment device such as disclosed in FIGS. 1 and 6, having bores 14 therein of suitable diameter to accommodate the contacts. It is necessary in this embodiment of the invention that a key 92 be provided on the body of the contact 90, which will engage a suitable keyway in the alignment element 12 to assure that the fibers 16 are axially aligned in the element.

The invention is also not limited to a contact having cylindrical alignment rods 30. It is only necessary that the inner adjacent surfaces of the rods have a like-cylindrical configuration. Thus, as illustrated in FIG. 9, a contact 94 may be provided which is identical to the contacts 16 except that the alignment rods 30 may have other than a cylindrical configuration. In FIG. 9, the outer surfaces 96 of the rods have an arcuate configuration corresponding to a cylinder having its center at the central axis of the cylindrical body 22 of the contact. The inner adjacent regions 98 of the contacts have a cylindrical configuration and are dimensioned to engage each other and the fiber 36 therebetween when the contact is pushed into the bore 14 of the alignment element 12.

It is, therefore, seen that by the present invention, there is provided a relatively simple and inexpensive disconnectable coupling arrangement for single optical fibers. The connector provides a controlled, accurate alignment of the mating optical fibers in a manner which minimizes light transmission losses to levels required for efficient long run single data transmission systems, yet is easily assembled and practical for commercial field use.

What is claimed is:

1. A fiber optic connector comprising:
   a deformable elastomeric alignment element having a bore therethrough;
   a pair of fiber optic contacts mounted in opposite ends of said bore, each said contact comprising three equal diameter, generally parallel, flexible cylindrical rods having an optical fiber positioned therebetween, the rods and fiber of each said contact terminating in a common planar mating end face; and
   said rods of each contact having an interference fit in said bore causing said rods to be resiliently compressed inwardly to engage each other and said fiber therebetween, whereby said fibers will become precisely laterally aligned.

2. A fiber optic connector as set forth in claim 1 wherein: said rods of each contact are resilient and laterally spaced from each other when said contact is removed from said bore.

3. A fiber optic connector for coupling single optical fibers comprising:
   a deformable elastomeric alignment element having a bore therethrough;
   a pair of like-sets of at least three rods mounted lengthwise in said bore, each said set of rods having adjacent like-shaped cylindrical surfaces providing at least one tricuspid interstitial space between said rods for receiving an optical fiber;
   all the rods of each said set of rods having front ends lying in a common plane transverse to the longitudinal axes of said rods providing a mating end face;
   said mating end faces of said sets of rods substantially abutting each other in said bore; and
   the region of said element surrounding said mating end faces being strained to exert a radially inwardly directed compressive force urging said rods of each set inwardly to cause said adjacent cylindrical surfaces thereof to engage each other so that the centers of any three contiguous rods of each set are disposed at the vertices of an equilateral triangle, whereby fibers in corresponding interstitial spaces in said sets of rods will become precisely laterally aligned.

4. A fiber optic connector as set forth in claim 3 wherein: said rods are cylindrical.

5. A fiber optic connector as set forth in claim 3 wherein: said rods are flexible.

6. A fiber optic connector as set forth in claim 3 wherein: said rods are of a deformable material.

7. A fiber optic connector for coupling single optical fibers comprising:
   a deformable elastomeric alignment element having a bore therethrough;
   a pair of like-sets of at least three rods mounted lengthwise in said bore, each said set of rods having adjacent like-shaped cylindrical surfaces providing at least one tricuspid interstitital space between said rods for receiving an optical fiber;
   each said set of rods being joined to a contact body;
   said body having an opening therein aligned wih each said interstitial space between said cylindrical surfaces and being dimensioned to receive an optical fiber therethrough;
   said sets of rods having mating end faces substantially abutting each other in said bore; and
   the region of said element surrounding said mating end faces being strained to exert a radially inwardly directed compressive force urging said rods of each set inwardly to cause said adjacent cylindrical surfaces thereof to engage each other so that the centers of any three contiguous rods of each set are disposed at the vertices of an equilateral triangle, whereby fibers in corresponding interstitial spaces in said sets of rods will become precisely laterally aligned.

8. A fiber optic connector as set forth in claim 7 wherein:
   said rods of each set are resilient and are laterally spaced from each other when said rods are removed from said bore, said rods being movable laterally toward each other adjacent to their free ends when inserted into said bore.

9. A fiber optic connector as set forth in claim 3 wherein:
each set of rods includes only three rods.

10. A fiber optic connector as set forth in claim 3 wherein:
each set of rods includes a sufficient number of rods to define a plurality of said interstitial spaces.

11. A fiber optic connector as set forth in claim 3 including:
an optical fiber in the interstitial space in each said set of rods; and
each said fiber having a mating end coplanar with the mating end face of its respective set of rods.

12. A fiber optic connector as set forth in claim 11 wherein:
said rods of each set are joined to its respective fiber.

13. A fiber optic connector as set forth in claim 7 including:
an optical fiber in the opening in each said body extending forwardly into the interstitial space in said set of rods joined to said body;
each fiber having a jacket thereon and an end portion from which said jacket has been removed; and
said end portion of said fiber having a mating end coplanar with the mating end face of its respective set of rods.

14. A fiber optic connector as set forth in claim 13 wherein:
recesses are formed in the adjacent cylindrical surfaces of said rods of each set adjacent to said body defining a passage aligned with the opening in said body; and
said jacket extends into said passage.

15. A fiber optic connector as set forth in claim 3 wherein:
said bore in said elastomeric alignment element includes a central portion of uniform diameter at the location of said abutment, and outwardly tapering end portions; and
the diameter of said central portion is less than the maximum cross-sectional dimension of said sets of rods at their mating end faces whereby said interstitial spaces, and hence fibers mounted therein, will become selfaligned when said rods are pushed into said central portion of said bore.

16. A fiber optic connector for coupling single optical fibers comprising:
a deformable elastomeric alignment element having a bore therethrough;
a pair of like-sets of at least three rods mounted lengthwise in said bore, each said set of rods having adjacent like-shaped cylindrical surfaces providing at least one tricuspid interstitial space between said rods for receiving an optical fiber;
said sets of rods having mating end faces substantially abutting each other in said bore;
the region of said element surrounding said mating end faces being strained to exert a radially inwardly directed compressive force urging said rods of each set inwardly to cause said adjacent cylindrical surfaces thereof to engage each other so that the centers of any three contiguous rods of each set are disposed at the vertices of an equilateral triangle, whereby fibers in corresponding interstitial spaces in said sets of rods will become precisely laterally aligned;
said bore in said elastomeric alignment element including a central portion of uniform diameter at the location of said abutment, and outwardly tapering end portions;
the diameter of said central portion being less than the maximum cross-sectional dimension of said sets of rods at their mating end faces whereby said interstitial spaces, and hence fibers mounted therein, will become self-aligned when said rods are pushed into said central portion of said bore;
each of said sets of rods being carried by a contact body; and
said alignment element having opposed end faces formed with counterbores therein aligned with said bore, said counterbores slidably receiving said contact bodies and being sufficiently deep to support said bodies in said element.

17. A fiber optic connector as set forth in claim 3 wherein:
said rods of each set are laterally spaced apart when said sets are removed from said bore;
the portion of said bore surrounding said mating end faces has a uniform diameter, said diameter being less than the maximum cross-sectional dimension of said sets of rods when said sets are removed from said bore, the wall of said uniform diameter bore portion being expanded thereby exerting said radially inwardly directed force on said rods; and
the portions of said bore from said uniform diameter bore portion toward the ends of said body tapering outwardly to diameters greater than said maximum dimension of said sets of rods.

18. A fiber optic connector as set forth in claim 3 including:
means for applying a compressive force to said elastomeric alignment element in a direction parallel to said bore to radially inwardly deform the walls of said bore.

19. A fiber optic connector for coupling a pair of single optical fibers comprising:
a pair of contacts each adapted to be terminated to a single optical fiber;
each said contact comprising a body having three equal diameter cylindrical, flexible posts extending forwardly therefrom and generally parallel to each other in closely adjacent, but not necessarily engaging relationship, defining therebetween an interstitial space;
the posts of each said contact terminating in a common mating end face;
a passage extending longitudinally through each said body in axial alignment with said space, said passage and space being dimensioned to receive a single optical fiber therein;
said posts being deflectable radially inwardly to engage each other and a fiber located in the interstitial space therebetween;
a deformable elastomeric alignment element having a bore therethrough;
said mating end faces of said contacts substantially axially abutting each other in said bore; and
the region of said sleeve surrounding said abutting end faces of said contacts being strained to exert a radially inwardly directed compressive force deflecting said posts of said contacts inwardly to engage each other so that the centers of the posts of each contact will become disposed at the vertices of an imaginary equilateral triangle, whereby fibers in said interstitial spaces in said contacts will become precisely laterally aligned.

20. A single fiber contact comprising:

a body having a front and a rear;

at least three generally parallel, laterally spaced, flexible posts extending forwardly from said front of said body;

said posts having adjacent like-shaped cylindrical surfaces thereon providing therebetween at least one interstitial space;

a bore in said body aligned with said space and extending from said front to said rear thereof, said bore being dimensioned to receive an optical fiber therein;

said posts being sufficiently flexible to deflect inwardly for said cylindrical surfaces to engage each other and a fiber in said space upon application of an inwardly directed compressive force applied to said posts; and said posts having arcuate recesses in said adjacent surfaces extending forwardly from said front of said body defining a passage coaxial with said bore and both dimensioned to receive therein a jacketed optical fiber, said recesses terminating behind the front faces of said posts.

* * * * *